United States Patent [19]

Keck

[11] Patent Number: 5,540,259

[45] Date of Patent: Jul. 30, 1996

[54] AUTOMATICALLY RELEASABLE SHUT-OFF COUPLING

[76] Inventor: Dieter Keck, 2313 Lakeshore Blvd. W., Apt. 514, Toronto, Ontario, Canada, M8V 1A8

[21] Appl. No.: 435,229

[22] Filed: May 5, 1995

[51] Int. Cl.$^6$ ............................ F16L 37/28; F16L 37/08
[52] U.S. Cl. .................. 137/614.05; 137/614.03; 251/149.2; 251/281
[58] Field of Search ............... 137/614.03, 614.05; 285/1; 251/149.2, 281

[56] References Cited

U.S. PATENT DOCUMENTS

| | | | |
|---|---|---|---|
| 2,789,838 | 4/1957 | Palm | 251/149.2 |
| 3,035,595 | 5/1962 | Beason, Jr. | 137/71 |
| 3,279,497 | 10/1966 | Norton et al. | 137/614.03 |
| 3,482,602 | 12/1969 | Jarnagan et al. | 137/614.05 |
| 3,580,414 | 5/1971 | Ginsburgh | 220/86 |
| 3,724,501 | 4/1973 | Scott | 137/630.19 |
| 4,429,713 | 2/1984 | Walter | 137/614.03 |
| 4,651,889 | 3/1987 | Uranishi et al. | 220/85 |
| 4,762,247 | 8/1988 | Temmesfeld | 220/303 |
| 5,123,447 | 6/1992 | Calvin et al. | 137/614.03 |
| 5,139,049 | 8/1992 | Jensen et al. | 137/614.05 |
| 5,238,034 | 8/1993 | Corfitsen | 141/94 |
| 5,271,438 | 12/1993 | Griffin | 141/59 |

*Primary Examiner*—A. Michael Chambers
*Attorney, Agent, or Firm*—Patrick J. Hofbauer

[57] ABSTRACT

An automatically releasable shut-off coupling, for use in high pressure fluid applications, has matable and separable stationary and break-away modules forming a housing having a substantially straight throughpassage. An intermediate carrier member is slidably retained within the stationary module for movement from a retracted position to an extended position, upon application of a threshold value force by the break-away module. A locking element is retained in a first recess in the intermediate carrier member for movement between a locked position, corresponding to the retracted position of the intermediate carrier member, at which locked position the locking element partially enters a cooperating second recess in the break-away module, thereby to preclude movement of the break-away module relative to the intermediate carrier member, and an unlocked position, corresponding to the extended position of the carrier member, at which unlocked position the locking element is in register with a cooperating third recess in the housing of the stationary module. First and second ramp portions disposed on the second recess and the locking element, respectively, contact each other when the intermediate carrier member is in its extended position, such that the locking element is forcibly ejected radially outwardly from the second recess, thereby permitting movement of the break-away module relative to the intermediate carrier member. Fluid flow precluding valves block the throughpassage when the stationary module and the break-away module are separated one from the other.

35 Claims, 5 Drawing Sheets

AUTOMATICALLY RELEASABLE SHUT-OFF COUPLING

FIELD OF THE INVENTION

This invention relates to couplings for use in high pressure fluid applications, and more particularly to automatically releasable shut-off couplings having a stationary module and a break-away module matable one to the other.

BACKGROUND OF THE INVENTION

High pressure fluids, such as liquid natural gas and propane, are becoming increasingly more common for use in powering vehicles and the like. In filling such a vehicle, a filling hose is operatively attached at its proximal end to a bulk supply tank of liquid natural gas ("LNG"), compressed natural gas ("CNG"), compressed hydrogen ("CH"), or propane and is temporarily removably connected at its opposite distal end to the vehicle by means of a fueling nozzle. The fueling nozzle is temporarily connected in sealed relation to a receiving coupling mounted on the vehicle. It is necessary to remove the fueling nozzle from the receiving coupling on the vehicle before the vehicle drives away. However, on occasion, vehicles are mistakenly driven away before the connected fueling nozzle is removed from the receiving coupling on the vehicle. Resultingly, the fueling nozzle on the filling hose may be forcibly ripped from the receiving coupling on the vehicle, thus causing damage to any one of or all of the filling hose, the inserted fueling nozzle, the receiving coupling, or the vehicle. Indeed, it is quite likely that the filling hose may be forcibly pulled from the outlet of the bulk supply tank of LNG, CNG, CH or propane, or may itself rupture, thus allowing the pressurized LNG or propane to escape unchecked from the bulk storage tank. This situation is, of course, quite dangerous, as it is conducive to explosions and personal injury. Moreover, it is harmful to the environment.

It is therefore necessary, often as regulated by law, to have an automatic shut-off device to stem the flow of LNG, CNG, CH or propane, should the filling hose become ruptured or detached as aforesaid. Typically, such automatic shut-off devices take the form of an automatically releasable shut-off coupling operatively integrated into the filling hose, which shut-off coupling is adapted to release upon an axially directed threshold force being applied along the filling hose. Upon said release, such automatically releasable shut-off couplings typically stem the egress of pressurized LNG, CNG, CH or propane from both segments of the hose which remain respectively attached to the vehicle and the bulk supply tank.

While known automatically releasable shut-off couplings for high pressure fluid applications provide an acceptable level of safety, they suffer from a number of disadvantages. They are generally unduly complicated in their number and arrangement of parts, and are therefore unduly expensive to manufacture and difficult to repair and assemble. They are also generally large, and undesirably heavy. Most importantly, the throughpassage that provides for the flow of fluid therethrough is extremely convoluted and restricted, often having a diameter of less than one millimeter. This unduly restricts flow rates and filling times. Moreover, the width of the throughpassage may vary several times along the longitudinal length of the shut-off coupling. Such changes in width not only further restrict flow rates of pressurized liquid through the coupling, but cause undesirable thermal gradients within the automatically releasable shut-off coupling at each point of width change. Such thermal gradients of highly pressurized fluids such as LNG, CNG, CH and propane may cause freezing and sticking of the mechanisms of the shut-off coupling. Also, prior art automatically releasable shut-off couplings are, by their structural design, typically limited to but a single threshold release force value, with the result that extensive re-design of prior art automatically releasable shut-off couplings may be required to change the threshold release force values for different applications.

It is, therefore, an object of the present invention to provide an automatically releasable shut-off coupling that solves these and other problems associated with known automatically releasable shut-off couplings suitable for high pressure fluid applications.

Accordingly, it is an object of the present invention to provide an automatically releasable shut-off coupling that has relatively fewer interacting parts and is relatively uncomplicated, and therefore inexpensive to manufacture, and relatively easy to assemble and repair.

It is another object of the present invention to provide an automatically releasable shut-off coupling that is smaller and lighter than prior art automatically releasable shut-off couplings.

It is yet another object of the present invention to provide an automatically releasable shut-off coupling having a substantially straight throughpassage for flow of the pressurized fluid through the coupling.

It is a further object of the present invention to provide an automatically releasable shut-off coupling having a straight throughpassage of substantially constant diameter or width along its length.

It is a further object of the present invention to provide an automatically releasable shut-off coupling having a straight throughpassage that does not cause undesirable thermal gradients along its length during the passage therethrough of fluids under high pressures.

It is yet a further object of the present invention to provide an automatically releasable shut-off coupling that is operable at a plurality of threshold release force values without extensive re-design of the coupling or a plurality of its components, but with the one change of a commonly available part.

SUMMARY OF THE INVENTION

In accordance with the present invention there is disclosed an automatically releasable shut-off coupling of the type having a stationary module and a break-away module matable one to the other, and together defining a housing having a longitudinal axis. The break-away module is separable from the stationary module upon separating movement of the break-away module along the longitudinal axis in a separating direction. The coupling is adapted for use in high pressure fluid applications and comprises a substantially straight throughpassage in the housing, and an intermediate carrier member having a first recess positioned therein in substantially transverse relation to the longitudinal axis. The intermediate carrier member is operatively retained within the stationary module for slidable movement relative to the housing of the stationary module along the longitudinal axis in the separating direction from a retracted position to an extended position upon application of a corresponding longitudinally directed force of threshold value applied to the intermediate carrier member by the break-away module. A first biasing means is operatively mounted between the housing of the stationary module and the intermediate carrier member so as to bias the intermediate carrier member toward the retracted position. A locking element is operatively retained by the intermediate carrier member in the first recess for movement substantially transverse to the longitudinal axis between a locked position, corresponding to the retracted position of the intermediate carrier member, at which locked position the locking element partially enters a cooperating second recess positioned in the break-away module, thereby to preclude relative movement of the break-away module relative to the intermediate carrier member, and an unlocked position, corresponding to the extended position of the carrier member, at which unlocked position the locking element is in register with a cooperating third recess positioned in the housing of the stationary module in substantially transverse relation to the longitudinal axis. Cooperating first and second ramp portions are disposed on the second recess and the locking element, respectively. The first and second ramp portions are shaped and dimensioned so as to be engaged in operative contact one with the other when the intermediate carrier member is in the extended position, such that the locking element is forcibly ejected radially outwardly from the second recess, thereby permitting relative movement of the break-away module relative to the intermediate carrier member. First and second valve members are operatively mounted on the stationary and break-away modules, respectively, for selectively blocking the throughpassage, thereby to preclude fluid flow through the throughpassage when the stationary module and the break-away module are separated one from the other, as aforesaid.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Reference will now be made to FIGS. 1–5, which show a preferred embodiment of the automatically releasable shut-off coupling of the present invention, as indicated by the general reference numeral 20. The automatically releasable shut-off coupling 20 is of the type having a stationary module, as indicated by the general reference numeral 30 and as shown separately in FIG. 4, and a break-away module, as indicated by the general reference numeral 40, and as shown separately in FIG. 5. The stationary module 30 and the break-away module 40 are matable one to the other and together define a housing 22 having a longitudinal axis "A". The break-away module 40 is separable from the stationary module 30 upon separating movement of the break-away module 40 along the longitudinal axis "A" in a separating direction, as indicated by arrow "B" in FIG. 1. The stationary module 30 is preferably connected to the storage tank end of a filling hose (not shown), while the breakaway module is preferably connected to the vehicle end of the filling hose.

The preferred embodiment of automatically releasable shut-off coupling 20 is adapted for use in high pressure fluid applications, but may also be used for other fluidic applications. Typically, such high pressure fluid applications involve LNG, CNG, CH or propane at pressures between about 2000 p.s.i. and 4000 p.s.i. Accordingly, the components of the automatically releasable shut-off coupling 20 are constructed quite robustly, preferably of brass or of high grade stainless steel, in order to safely withstand internal fluid pressure of this magnitude.

The housing 22 of the stationary module 30 comprises a substantially cylindrical sleeve portion 60 having an inner surface 62 and an outer surface 64 and terminates in an inwardly directed annular flange 66. The housing 22 of the stationary module 30 further comprises a substantially cylindrical barrel portion 70 extending outwardly from the substantially cylindrical sleeve portion 60 thereof. The barrel portion 70 has an inner surface 72 and an outer surface 74, and terminates at its end proximal to the sleeve portion 60 in a longitudinally aligned, outwardly directed annular flange 76, and an inwardly directed annular flange 78. The outwardly directed annular flange 76 abuts against the inwardly directed annular flange 66 of the substantially cylindrical sleeve portion 60. Further, the outer periphery 77 of the outwardly directed annular flange 76 frictionally engages the inner surface 62 of the substantially cylindrical sleeve portion 60, and the outer periphery 67 of the inwardly directed annular flange 66 frictionally engages the outer surface 74 of the substantially cylindrical barrel portion 70. Welding or other conventional attachment methods are used to rigidly join the outwardly directed annular flange 76 to the inwardly directed annular flange 66 to form a unitary housing structure 22.

The housing 22 of the break-away module 40 comprises substantially cylindrical sleeve portion 140 having an inner surface 142 and an outer surface 144. The housing 22 further comprises a substantially cylindrical barrel portion 146 extending axially outwardly from the sleeve portion 140, and having an inner surface 148 and an outer surface 149. The substantially cylindrical sleeve portion 140 and the substantially cylindrical barrel portion 146 are integrally adjoined one to the other at an annular shoulder 150, and are generally concentric one with the other about the longitudinal axis "A". The barrel portion 146 of the break-away module 40 includes an outlet 152 in fluid communication with the throughpassage 24, which outlet 152 is shaped and dimensioned to retain a conventional fitting on a filling hose (not shown), in threaded engagement therewith, at thread 153. A bushing member 45 having a cylindrical passage 44 centrally disposed therein is retained within the sleeve portion 140 of the break-away module 40 by means of a lock ring 154. The bushing member 45 abuts against a flap holder 156. Rubber "O"-ring 159 is disposed in sealing relation between the bushing member 45 and the flap holder 156.

The stationary module 30 is connected in fluid communication at its first axial end 31 to the coupling of a conventional inlet hose (not shown). An outer portion of the coupling fits around the inlet nozzle 35, which inlet nozzle 35 is disposed at the outer end of an inlet bushing 32. A metal snap washer 82 is preferably disposed within an annular race 73 in the inner surface 72 of the barrel portion 70. The metal washer 82 abuts against the inlet bushing 32, so as to thereby help retain the inlet bushing 32 in place within the barrel portion 70 of the stationary module 30 so as to allow swivelling movement relative to the substantially cylindrical barrel portion 70. An "O"-ring 34 is preferably disposed in another annular recess 37 formed between the inlet nozzle 35 and a thread 39, so as to provide a fluid-tight seal between the inlet nozzle 35 of the stationary module 30 and the coupling (not shown) of the inlet hose (not shown).

The housing 22 of the shut-off coupling 20 has a substantially straight throughpassage 24, which throughpassage 24 is in fluid communication with the inlet hose (not shown) attached to the inlet nozzle 35 of the stationary module 30. The substantially straight throughpassage 24 is generally defined by a first fixed conduit portion 86 and a second movable conduit portion 99, having an internal end 101 and an external end 103, as will be discussed in greater detail subsequently. The substantially straight throughpassage 24 permits substantially laminar flow of the LNG, CNG, CH or propane therethrough. In this manner, there is a maximized throughput of LNG, CNG, CH or propane per unit time, and minimum pressure drop from the internal end 101 to the external end 103. Further, there are no localized pressure changes that might cause unwanted temperature gradients.

The first fixed conduit portion 86 is securely retained within a longitudinal bore 84 centrally disposed in the inlet bushing 32 by means of a metal washer 36 disposed at the bottom of the race 38, which metal washer 36 engages an annular race 38' which encircles the outer circumference of the fixed conduit portion 86. An "O"-ring 88 seated within a cooperating annular race 89 in the inlet bushing 32 helps to seal the passage of fluid between the inlet bushing 32 and the outer circumference of the first fixed conduit portion 86.

Figure 1:
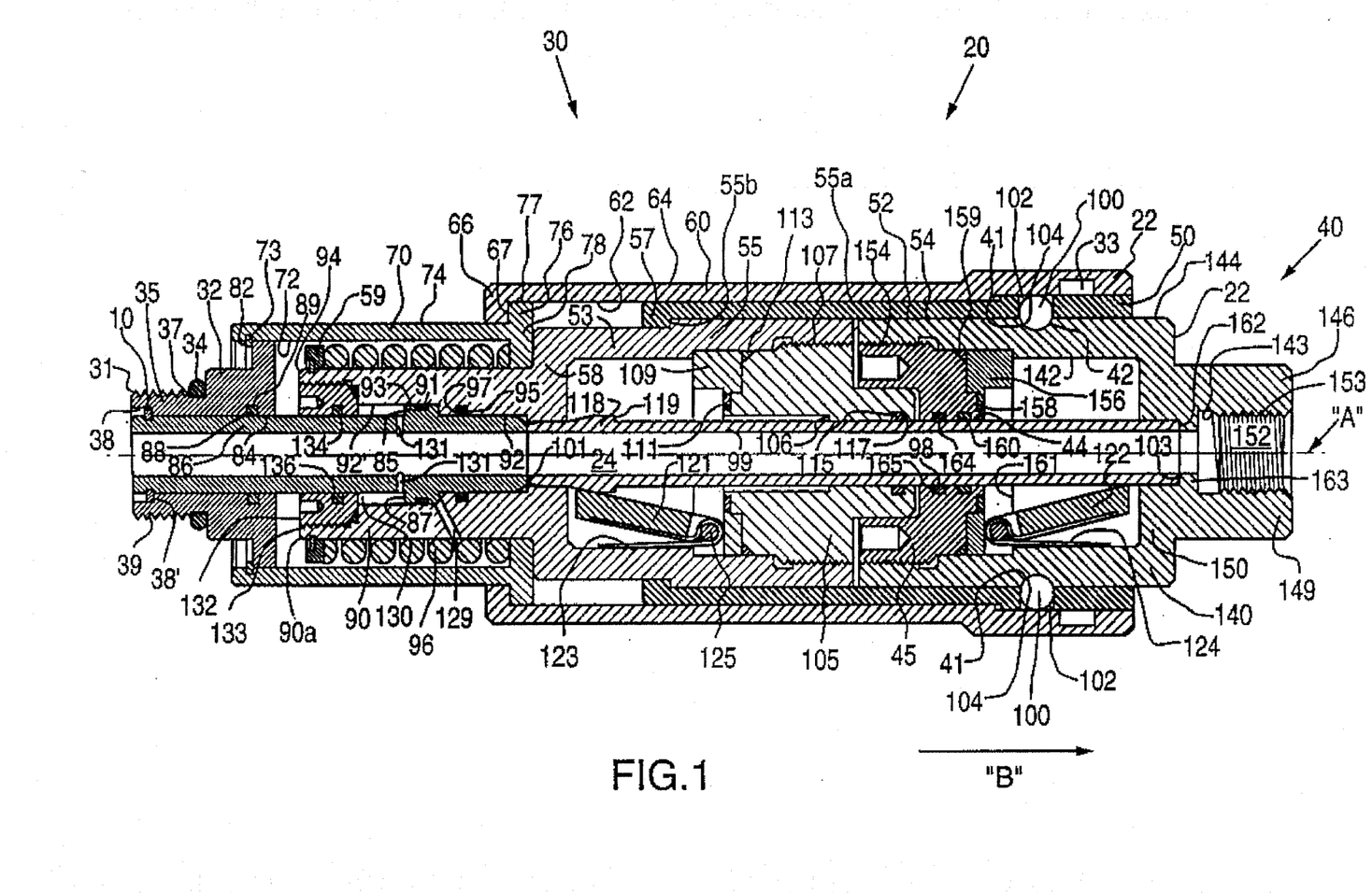
FIG. 1 is a side sectional view of a preferred embodiment of an automatically releasable shut-off coupling according to the present invention, having a stationary module and a break-away module mated one to the other in fluid communicating relation, and with an intermediate carrier member shown in its retracted position.
Figure 2:
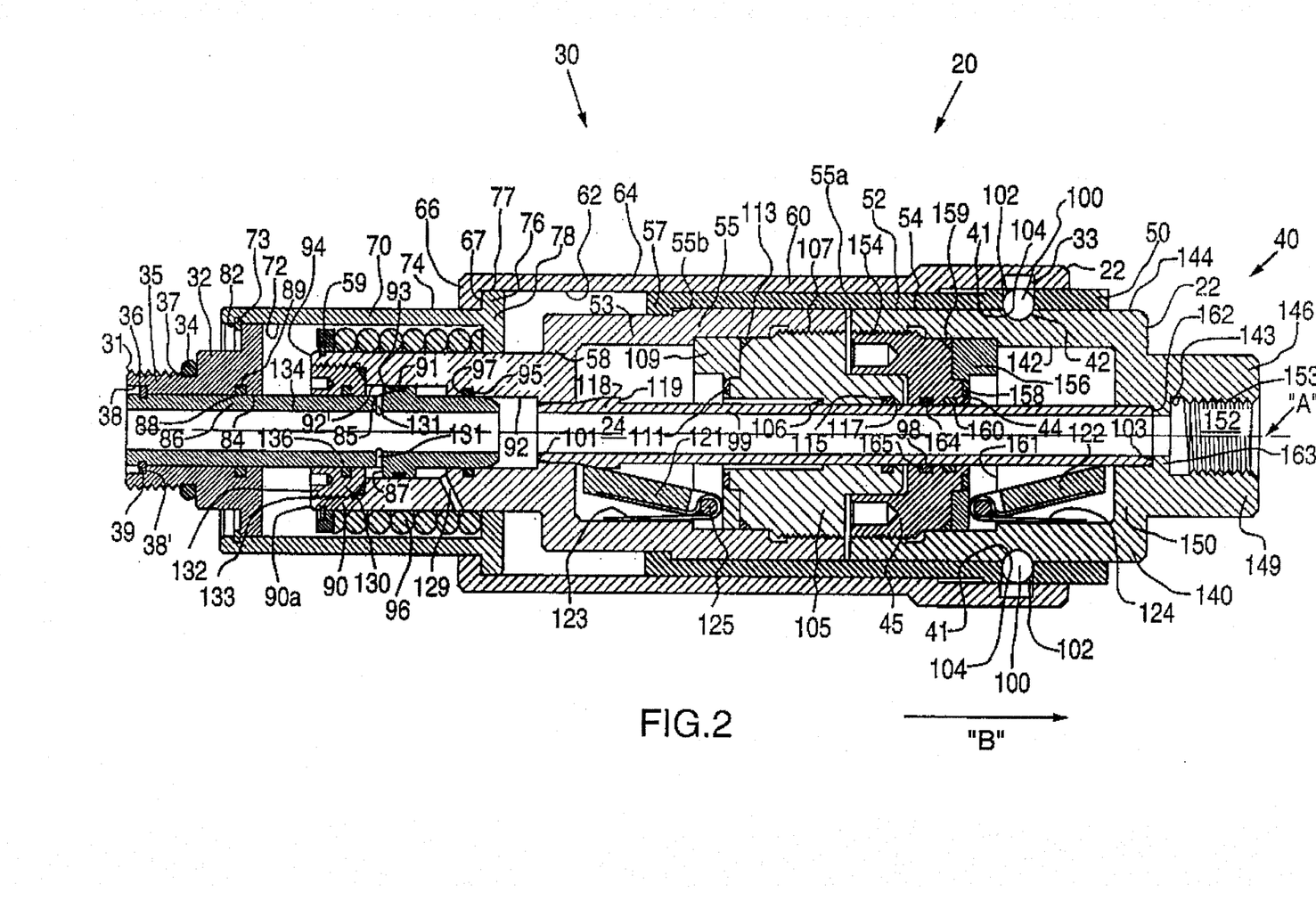
FIG. 2 is a side sectional view similar to FIG. 1, with the intermediate carrier member shown in its extended position.
Figure 3:
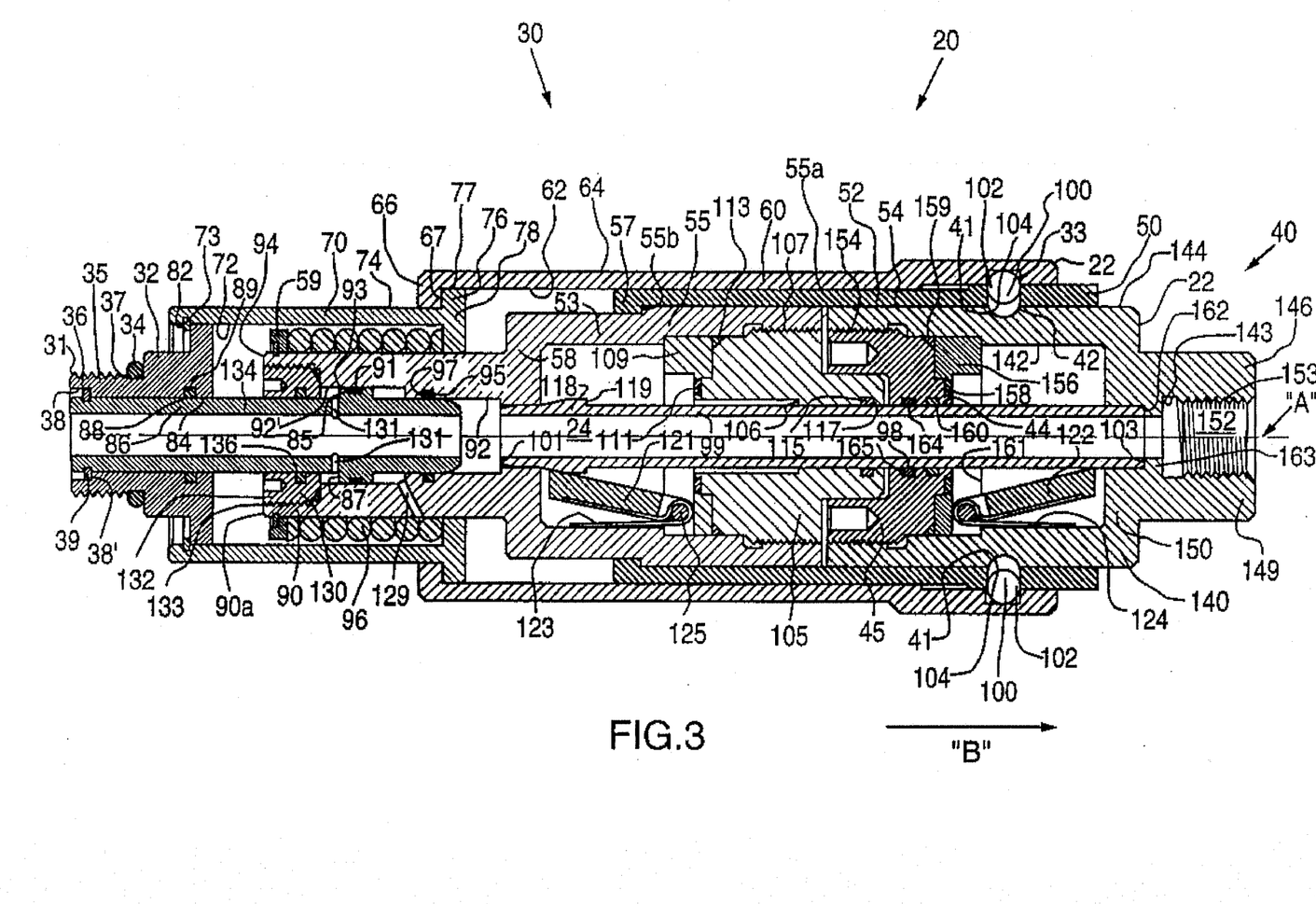
FIG. 3 is a side sectional view similar to FIG. 2, with the break-away module about to pull away from the stationary module.

An intermediate carrier member 50 is operatively retained within the stationary module 30 for slidable movement relative to the housing 22 of the stationary module 30 along the longitudinal axis "A". The intermediate carrier member 50 moves slidably in the separating direction of arrow "B" from a retracted position, as is best seen in FIG. 1, to an extended position, as is best seen in FIGS. 2 and 3, upon application of a correspondingly longitudinally directed force of threshold value applied to the intermediate carrier member 50 by the break-away module 40 in the separating direction of arrow "B" as will be discussed in greater detail subsequently. In the preferred embodiment, the threshold value of the correspondingly longitudinally directed force is a force of about one hundred pounds.

The intermediate carrier member 50 comprises a substantially cylindrical sleeve portion 52 having an inner surface 54 and an outer surface 56. The substantially cylindrical sleeve portion 52 terminates in an inwardly directed annular flange 57. A substantially cylindrical secondary sleeve portion 53 has an enlarged end portion 55, which enlarged end portion 55 is securely engaged within the sleeve portion 52, such that the outer surface 55a of the enlarged end portion 55 is in intimate contact with the inner surface 54 of the sleeve portion 52. A shoulder portion 55b defining the start of the enlarged end portion 55 abuts against the inwardly directed annular flange 57 of the sleeve portion 52, and is rigidly joined thereto as by, for example, welding, threading, or lock rings.

The substantially cylindrical sleeve portion 52 of the intermediate carrier member 50 is slidably retained within the substantially cylindrical sleeve portion of the housing 22 of the stationary module 30, such that the outer surface 56 of the sleeve portion 52 of the intermediate carrier member 50 is disposed adjacent the inner surface 62 of the sleeve portion 60 of the stationary module 30. The substantially cylindrical sleeve portion 60, the substantially cylindrical sleeve portion 52 and the substantially cylindrical secondary sleeve portion 53 are generally concentric one with the other about the longitudinal axis "A". The substantially straight throughpassage 24 is generally concentric with the sleeve portion 60 of the housing of the stationary module, the sleeve portion 52 of the intermediate carrier member, and the sleeve portion 140 of the break-away module 40, about the longitudinal axis "A" of the housing 22. The substantially cylindrical sleeve portion 140 of the break-away module 40 is slidably retained within the substantially cylindrical sleeve portion 52 of the intermediate carrier member 50 such that the outer surface 144 of the substantially cylindrical sleeve portion 140 of the break-away module 40 is disposed adjacent the inner surface 54 of the substantially cylindrical sleeve portion 52 of the intermediate carrier member 50.

The intermediate carrier member 50 further comprises a substantially cylindrical barrel portion 90 extending outwardly from the sleeve portion 52 of the intermediate carrier member 50. The substantially cylindrical barrel portion 90 has an inner surface 92 and an outer surface 94. The substantially cylindrical barrel portion 90 of the intermediate carrier member 50 is slidably retained within the substantially cylindrical barrel portion 70 of the housing 22 of the stationary module 30 such that the outer surface 94 of the barrel portion 90 of the intermediate carrier member 50 is disposed adjacent the inner surface 72 of the barrel portion 70 of the housing 22 of the stationary module 30. The intermediate carrier member 50 further comprises a plurality of first recesses in the form of cylindrical bores 102 equally spaced one from the next around the outer surface 56 of the intermediate carrier member 50. The cylindrical bores 102 are positioned in the intermediate carrier member 50 in substantially transverse relation to the longitudinal axis "A". The sleeve portion 60 of the housing 22 of the stationary module 30 overlies the cylindrical bores 102 in occluding relation when the intermediate carrier member 50 is in the retracted position.

A radial shoulder portion 58 on the intermediate carrier member 50 abuts against the inwardly directed annular flange 66 of the housing 22 of the stationary module 30, so as to define a stop for the intermediate carrier member 50 when the intermediate carrier member 50 is in its retracted position.

The first fixed conduit portion 86 is further slidably retained within the substantially cylindrical barrel portion 90 of the intermediate carrier member 50 for movement therewithin. An "O"-ring 91 is retained within an annular race 93 in the annular flange 85 of the first fixed conduit portion 86, and an "O"-ring 95 is retained within an annular race 97 in the barrel portion 90 of the intermediate carrier member 50, to assist in ensuring that the first intermediate conduit portion 86 is sealed in fluid-tight relation with respect to the intermediate carrier member 50.

Figure 4:
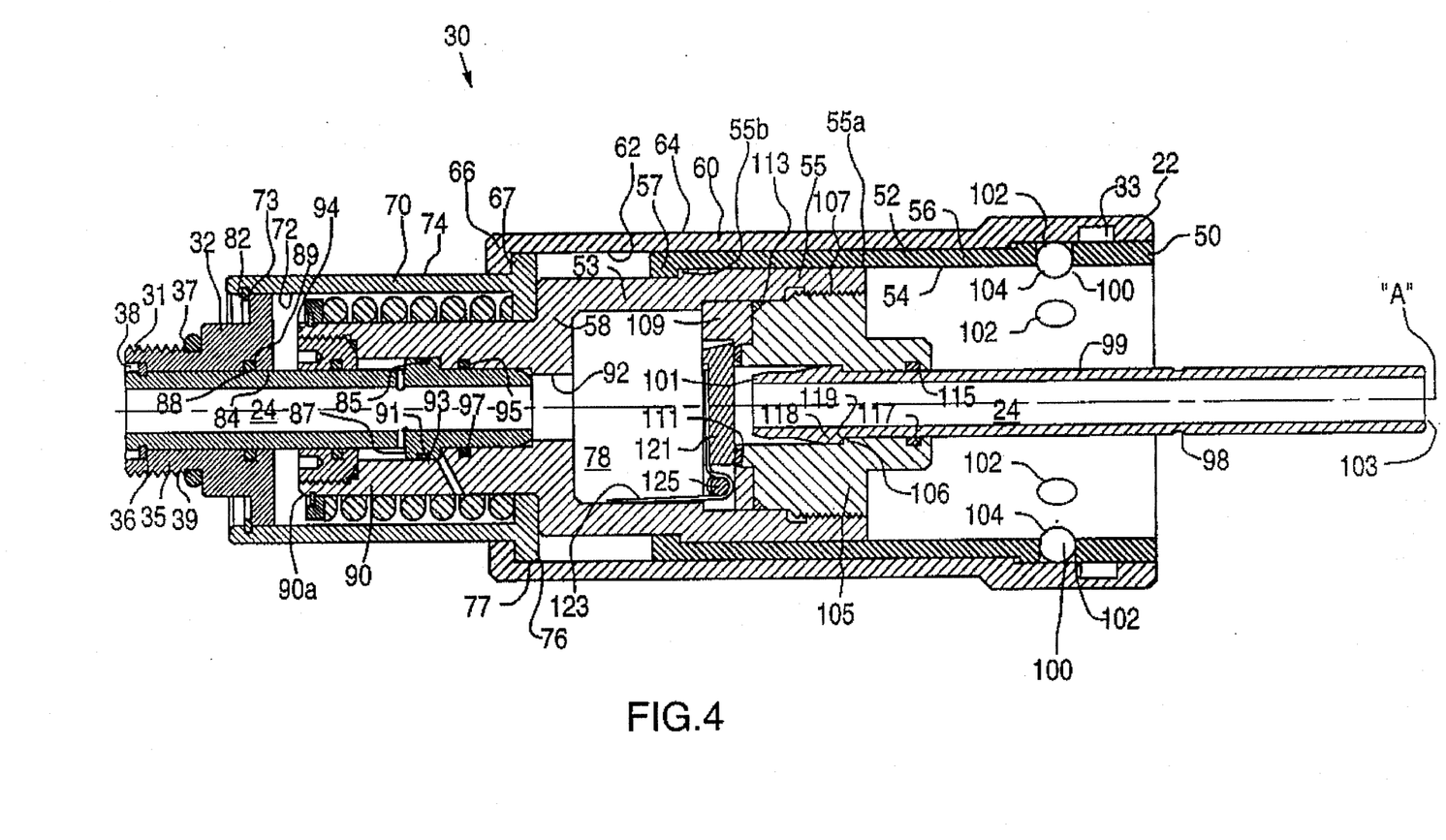
FIG. 4 is a side sectional view of the stationary module of FIG. 1.
Figure 5:
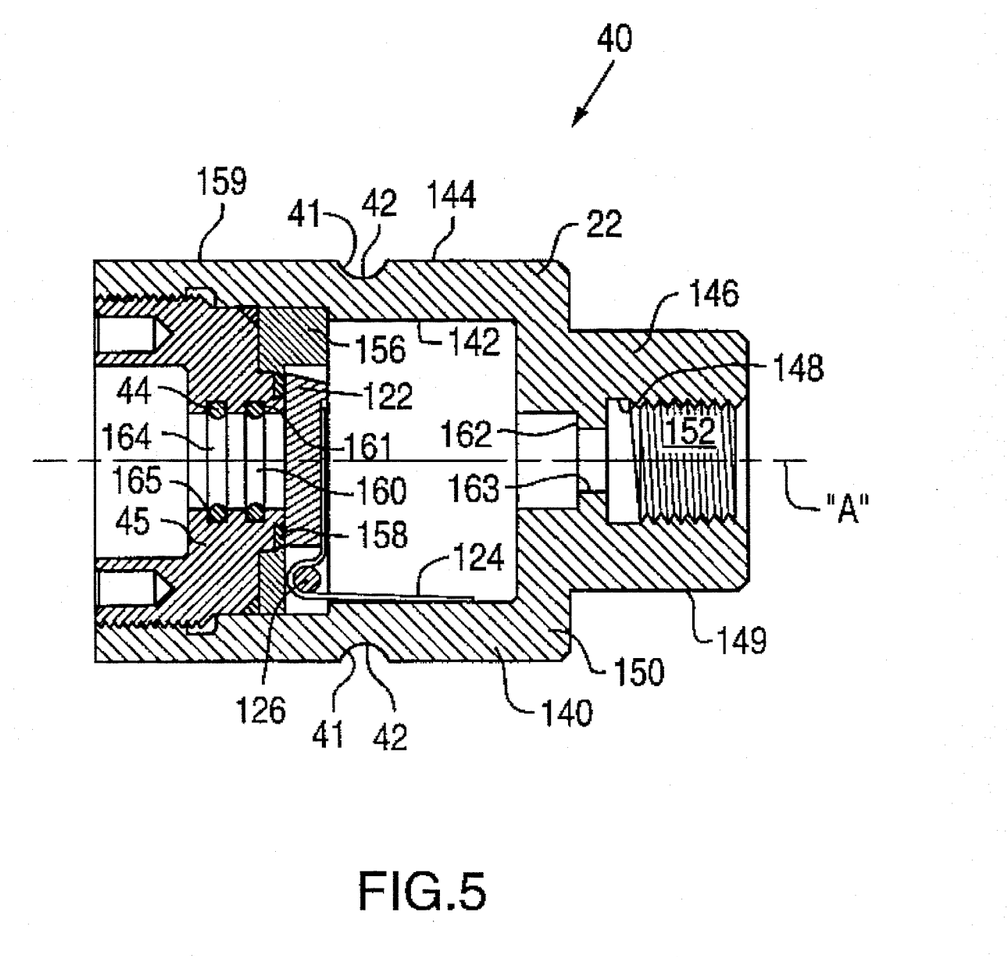
FIG. 5 is a side sectional view of the break-away module of FIG. 1.

A collar member 105 is securely retained within the substantially cylindrical secondary sleeve portion 53 of the intermediate carrier member 50 by means of a thread 107. The collar member 105 abuts against an annular flap holder bushing 109. Rubber "O"-ring 113 is disposed in sealing relation between the collar member 105 and the flap holder bushing 109. The collar member 105 retains the second moveable conduit member 99 in slidable relation therein. An "O" ring 115 is disposed in an annular race 117 in the collar member 105 to form a seal between the collar member 105 and the second moveable conduit portion 99. The second moveable conduit portion 99 is operatively retained within the intermediate carrier member 50 of the stationary module 30 for slidable movement relative to the intermediate carrier member 50 along the longitudinal axis "A", when the intermediate carrier member 50 is moving to its extended position. The second conduit portion 99 is moveable between a withdrawn position, as best seen in FIG. 1, whereat the second moveable conduit portion 99 is adjoined to the first fixed conduit portion 86 in fluid communicating end to end relation, (which corresponds to the intermediate carrier member 50 being in its retracted position), and a protruding position, whereat the second moveable conduit portion 99 is removed from the aforesaid adjoinment to the first fixed conduit portion 86, as best seen in FIG. 4. An annularly disposed intermediate shoulder 119 on a flared collar ring 118 of the second moveable conduit portion 99 contacts a cooperating radial shoulder 106 of the collar member 105, to thereby provide a stop for the second moveable conduit portion 99, in the separating direction as indicated by arrow "B" of FIG. 1.

The second moveable conduit portion 99 is received in slidable relation through the cylindrical passage 44 in the bushing member 45. An "O"-ring 160 disposed in an annular race 161 in the bushing member 45 forms a seal between the bushing member 45 and the second moveable conduit portion 99. The external end 103 of the second movable conduit portion 99 abuts against a shoulder portion 162, of the break-away module 40, which shoulder portion 162 is defined by an inwardly directed annular flange 163, which annular flange 163 itself further defines the substantially straight throughpassage 24.

A metal snap ring 164 is disposed in an annular race 165 in the bushing member 45 so as to frictionally engage a cooperating annular race 98 in the second moveable conduit portion 99. The snap ring 164 is releasable from the annular race 166 upon being subjected to a pulling force in the separating direction of arrow "B", which pulling force exceeds the friction force of the second moveable conduit portion 99 in the stationary module 30, thus ensuring that the second moveable conduit portion 99 moves with respect to the intermediate carrier member 50 upon initial movement of the break-away module 40 in the separating direction of arrow "B".

A first biasing means comprising a spring member in the form of a coil spring 96 is disposed around the substantially cylindrical barrel portion 90 of the intermediate carrier member 50, and is operatively mounted between the housing 22 of the stationary module 30 (specifically the radially inwardly directed annular flange 78), and the intermediate carrier member 50 (specifically the outwardly directed annular flange 59 affixed to the barrel portion 90 of the intermediate carrier member 50). The coil spring 96 biases the intermediate carrier member 50 towards its retracted position, so as to resist forces imparted by the break-away module 40 to the intermediate carrier member, in the separating direction of arrow "B". The coil spring 96 is in compression at all times, so as to provide such biasing force, and is preferably constructed and arranged to provide a biasing force of about one hundred pounds, when the intermediate carrier member 50 is in its extended position.

A locking element comprises a plurality of roller balls 100 retained one each in the corresponding plurality of equally spaced cylindrical bores 102, with each of the cylindrical bores 102 forming a first recess positioned in the intermediate carrier member 50, in substantially transverse relation to the longitudinal axis "A". The roller balls 100 are operatively retained in the respective cylindrical bores 102 for movement substantially transverse to the longitudinal axis "A" between a locked position, as best seen in FIG. 1, and an unlocked position as best seen in FIG. 3. As can be best seen in FIG. 1, the locked position of the roller balls 100 corresponds with the retracted position of the intermediate carrier member. The roller balls 100 each partially enter a respective cooperating second recess 42 positioned in the outer surface 144 of the substantially cylindrical sleeve portion 140 of the break-away module 40, thereby to preclude relative movement of the break-away module 40 relative to the intermediate carrier member 50. In the preferred embodiment shown, the second recess 42 comprises an annular race having a semi-circular cross-section of less than 180° angular displacement, as will be discussed in greater detail subsequently.

In the locked position, the roller balls 100 are precluded from being radially ejected from the second recess 42 by the substantially cylindrical sleeve portion 60 of the housing 22 of the stationary module 30, which sleeve portion 60 overlies the cylindrical bores 102 in occluding relation, in all but the unlocked position.

In the unlocked position of the roller balls 100, which unlocked position corresponds with the extended position of the carrier member, the roller balls 100 are each in register with a cooperating third recess 33 positioned in the housing 22 of the stationary module 30, in substantially transverse relation to the longitudinal axis "A". In the preferred embodiment shown, the third recess 33 comprises an annular race positioned on the inner surface 62 of the substantially cylindrical sleeve portion 60 of the housing 22 of the stationary module 30. Each of the roller balls 100 partially engages the third recess 33, upon being forcibly radially ejected outwardly from the second recess 42, thereby precluding further relative movement of the intermediate carrier member 50 relative to the housing 22 of the stationary module 30 in the separating direction of arrow "B" but allowing for continued axial movement of the break-away module 40 in the separating direction of arrow "B".

Cooperating first ramp portions 41, are disposed on the second recess 42 as a ramped surface of the second recess 42, and second ramp portions 104, are disposed one each on each of the roller balls 100. Both the first 41 and the second 104 ramp portions are shaped and dimensioned so as to be engaged in operative contact one with the other when the intermediate carrier member 50 is in its extended position, as is best seen in FIG. 2. The first ramp portion 41 on the second recess 42 comprises the end portion of the less than 180° annular race, so as to thereby face generally radially outwardly from the longitudinal axis "A" and towards the separating direction of arrow "B". Accordingly, when the break-away module 40 is pulled in the separating direction of arrow "B", the second ramp portions 104 on each of the respective roller balls 100 are each engaged by a cooperating first ramp portion 41, so as to forcibly radially eject outwardly from the second recess 42, as caused by the shape and interaction of the first ramp portion 41 and the second ramp portion 104. When the roller balls 100 are ejected radially outwardly from the second recess 42, movement of the break-away module 40 relative to the intermediate carrier member 50 in the separating direction as indicated by arrow "B" is thereby permitted, so as to permit complete separation of the stationary module 30 from the break-away module 40.

A first valve member 121, in the form of a flap valve, is operatively mounted on the stationary module 50, specifically on the annular flap holder bushing 109 in the intermediate carrier member 50, for selectively blocking the throughpassage 24, at the internal end 101 of the second moveable conduit portion 99, when the second moveable conduit portion 99 is in its protruding position, as best seen in FIG. 4, thereby to preclude fluid flow through the throughpassage 24. The first valve member 121 is biased to its blocking position by a torsion spring member 123 operatively mounted on a shaft 125 between the first valve member 121 and the intermediate carrier member 50. Movement of the second moveable conduit portion 99 from its withdrawn position to its protruding position, as caused by initial movement break-away module 40 in the separating direction of arrow "B", as aforesaid, ensures that the first valve member 121 closes. Rubber "O"-ring 111 is disposed in sealing relation between the collar member 105 and the first valve member 121.

A second valve member 122, also in the form of a flap valve, is operatively mounted on the break-away module 40, specifically on an annular flap holder bushing 156. The second valve member 122 is biased to its blocking position by a torsion spring member 124 operatively mounted on a pivot shaft 126 between the second valve member 122 and the break-away module 40. The second valve member 122 blocks the cylindrical passage 44 in the bushing member 45 of the break-away module 40, after the break-away module 40 has been pulled in the separating direction of arrow "B" completely clear of the second moveable conduit portion 99, as previously described. Rubber "O"-ring 158 is disposed in sealing relation between the bushing member 45 and the second valve member 122.

A balancing chamber 130 is preferably provided, and is disposed in operative relation between the housing 22 of the stationary module 30 and the intermediate carrier member 50. More particularly, the balancing chamber 130 is defined by an annular collar member 132 disposed in secure relation around the first fixed conduit portion 86 with an "O"-ring 134 disposed in an annular race 136 in the annular collar member 132 in sealing relation between the annular collar member 132 and the first fixed conduit portion 86. The annular collar member 132 is securely retained in the end 90a of the substantially cylindrical barrel portion 90 of the intermediate carrier member 50 by a thread 133. The balancing chamber 130 is further defined by a portion 92' of the inner surface 92 of the barrel portion 90, and by a shoulder portion 87 of an annular flange 85 of the first fixed conduit portion 86. The balancing chamber 130 is in fluid communication with the throughpassage 24 in the housing 22 of the stationary module 30 through a plurality of orifices 131 in the first fixed conduit portion 86. The pressurized fluid from within the throughpassage 24 of the shut-off coupling 20 enters into the balancing chamber 130 through the orifices 131, to thereby oppose the forces acting on the intermediate carrier member 50, specifically the second moveable conduit portion 99, in the separating direction of arrow "B". In this manner, the overall forces acting in opposed directions along the longitudinal axis "A" are substantially balanced, thus precluding the fluid pressure within the shut-off coupling 20 from urging the intermediate carrier member 50 from its retracted position towards its extended position. As best seen in FIG. 2 and 3, a second chamber 128 is formed on the other side of the annular flange 85 opposite to the balancing chamber 130, when the intermediate carrier member 50 is moved towards its extended position. The pressurized fluid within the shut-off coupling 20 enters fills second chamber 128. A vent channel 129 disposed in the barrel portion 90 of the intermediate carrier member 50 vents the second chamber 128 ultimately to the ambient surroundings so as to preclude pressure build up in the second chamber 128, which pressure build up would otherwise negate the effect of the balancing chamber 130. The balancing chamber 130 permits the shut-off coupling 20 to function substantially independently of the fluid pressure of the contained LNG, CNG, CH or propane.

In use, when the break-away module 40 is pulled along the second longitudinal axis "A" in the separating direction of arrow "B", perhaps by a vehicle driving away from a filling station before the filling hose is detached from the vehicle, the break-away module 40 and the stationary module 30 are mated together, as is best seen in FIG. 1. Relative movement of the break-away module 40 relative to the intermediate carrier member 50 is precluded by means of the roller balls 100 being in their locked position whereat the roller balls 100 partially enter the cooperating second recesses 42. As the break-away module 40 moves in the separating direction of arrow "B" the intermediate carrier member 50 is thereby carried by the movement of the break-away module 40 in the separating direction of arrow "B" until the intermediate carrier member 50 reaches its extended position, whereat the roller balls 100 are in register with the cooperating third recess 33. At this position, continued movement in the separating direction causes the first ramp portion 41 on each of the second recess 42 to forcibly engage the respective second ramp portions 104 on each of the roller balls 100, such that the roller balls 100 are forcibly ejected radially outwardly from the second recess 42, thereby permitting relative movement of the break-away module 40 and the intermediate carrier member 50. The break-away module 40 continues to move in the separating direction of arrow "B" and pulls the second moveable conduit portion 99 in the separating direction of arrow "B" by virtue of the metal snap ring 164 frictionally engaging the cooperating annular race 99 in the second moveable conduit portion 99. The second moveable conduit portion 99 is pulled in this manner and direction until the shoulder 119 on the flared collar ring 118 engages the radial shoulder 106 of the collar member 105. At this point, the movement of the second moveable conduit portion 99 in the separating direction of arrow "B" is arrested; the snap ring 164 is pulled from engagement with the cooperating annular recess 98, and the break-away module 40 is pulled in the separating direction of arrow "B" away from sliding engagement with the stationary module 30. After the second moveable conduit portion 99 has moved to its protruding position, the valve member 121 closes over the internal end 101 of the second moveable conduit portion 99 so as to block the throughpassage 24 thereat, thus precluding the escape of pressurized fluid from the stationary module 30. Similarly, when the break-away module 40 pulls away from the second moveable conduit portion 99, as the external end 103 of the second moveable conduit portion 99 is cleared from the break-away module 40, the second valve member 122 closes under biasing of the torsion spring 124 so as to block the cylindrical passage 44 of the collar member 105, thus precluding the escape of pressurized fluid from the break-away module 40.

Other embodiments of the present invention also fall within the scope and spirit of the claims presented herein. For instance, in one such alternative embodiment, (not illustrated), it is contemplated that the first and second valve members could comprise ball-type valves.

I claim:

1. An automatically releasable shut-off coupling of the type having a stationary module and a break-away module matable one to the other, and together defining a housing having a longitudinal axis, with said break-away module being separable from said stationary module upon separating movement of said break-away module along said longitudinal axis in a separating direction, said coupling being adapted for use in high pressure fluid applications and comprising:

a substantially straight throughpassage in the housing;

an intermediate carrier member having a first recess positioned therein in substantially transverse relation to said longitudinal axis, said intermediate carrier member being operatively retained within said stationary module for slidable movement relative to the housing of said stationary module along said longitudinal axis in said separating direction from a retracted position to an extended position upon application of a correspondingly longitudinally directed force of threshold value applied to said intermediate carrier member by said break-away module;

first biasing means operatively mounted between the housing of said stationary module and said intermediate carrier member so as to bias said intermediate carrier member toward said retracted position;

a locking element operatively retained by said intermediate carrier member in said first recess for movement substantially transverse to said longitudinal axis between a locked position, corresponding to said retracted position of said intermediate carrier member, at which locked position said locking element partially enters a cooperating second recess positioned in said break-away module, thereby to preclude relative movement of said break-away module relative to said intermediate carrier member, and an unlocked position, corresponding to said extended position of said carrier member, at which unlocked position said locking element is in register with a cooperating third recess positioned in the housing of said stationary module in substantially transverse relation to said longitudinal axis;

cooperating first and second ramp portions disposed on said second recess and said locking element, respectively, said first and second ramp portions being shaped and dimensioned so as to be engaged in operative contact one with the other when said intermediate carrier member is in said extended position, such that said locking element is forcibly ejected radially outwardly from said second recess, thereby permitting relative movement of said break-away module relative to said intermediate carrier member; and, first and second valve members operatively mounted on said stationary and break-away modules, respectively, for selectively blocking said throughpassage, thereby to preclude fluid flow through said throughpassage when said stationary module and said break-away module are separated one from the other, as aforesaid.

2. An automatically releasable shut-off coupling according to claim 1, wherein said locking element partially engages said third recess, upon being forcibly ejected radially outwardly from said second recess, thereby precluding further relative movement of said intermediate carrier member relative to the housing of said stationary module in said separating direction.

3. An automatically releasable shut-off coupling according to claim 2, wherein said locking element comprises a roller ball.

4. An automatically releasable shut-off coupling according to claim 3, wherein the housing of said stationary module comprises a substantially cylindrical sleeve portion having an inner surface and an outer surface.

5. An automatically releasable shut-off coupling according to claim 4, wherein said intermediate carrier member comprises a substantially cylindrical sleeve portion having an inner surface and an outer surface.

6. An automatically releasable shut-off coupling according to claim 5, wherein said substantially cylindrical sleeve portion of said intermediate carrier member is slidably retained within said substantially cylindrical sleeve portion of the housing of said stationary module, such that said outer surface of said intermediate carrier member is disposed adjacent said inner surface of the housing of said stationary module.

7. An automatically releasable shut-off coupling according to claim 6, wherein said sleeve portion of the housing of said stationary module overlies said first recess in occluding relation when said intermediate carrier member is in said retracted position, so as to preclude said locking element from being ejected from said second recess.

8. An automatically releasable shut-off coupling according to claim 7, wherein the housing of said break-away module comprises a substantially cylindrical sleeve portion having an inner surface and an outer surface.

9. An automatically releasable shut-off coupling according to claim 8, wherein said substantially cylindrical sleeve portion of said break-away module is slidably retained within said substantially cylindrical sleeve portion of said intermediate carrier member such that said outer surface of said substantially cylindrical sleeve portion of said break-away module is disposed adjacent said inner surface of said substantially cylindrical sleeve portion of said intermediate carrier member.

10. An automatically releasable shut-off coupling according to claim 9, wherein the sleeves of the housing of said stationary module, said intermediate carrier member, and said break-away module are generally concentric one with another about said longitudinal axis of said housing.

11. An automatically releasable shut-off coupling according to claim 10, wherein said substantially straight throughpassage is generally concentric with said sleeve portions of the housing of said stationary module said intermediate carrier member and said break-away module, about said longitudinal axis of said housing.

12. An automatically releasable shut-off coupling according to claim 11, wherein said first recess is in the form of a cylindrical bore.

13. An automatically releasable shut-off coupling according to claim 12, wherein said second recess comprises an annular race.

14. An automatically releasable shut-off coupling according to claim 13, wherein said annular race has a semi-circular cross-section of less than 180° angular displacement.

15. An automatically releasable shut-off coupling according to claim 14, wherein said third recess is positioned on said inner surface of said substantially cylindrical sleeve portion of the housing of said stationary module.

16. An automatically releasable shut-off coupling according to claim 15, wherein said third recess comprises an annular race.

17. An automatically releasable shut-off coupling according to claim 16, wherein said locking element comprises a plurality of roller balls retained one each in a corresponding equally spaced plurality of said cylindrical bores.

18. An automatically releasable shut-off coupling according to claim 17, wherein said first ramp portion is formed as a surface on said second recess, which first ramp portion faces generally radially outwardly from said longitudinal axis and towards said separating direction.

19. An automatically releasable shut-off coupling according to claim 18, wherein the housing of said stationary module further comprises a substantially cylindrical barrel portion extending outwardly from said sleeve portion thereof, said barrel portion having an inner surface and an outer surface.

20. An automatically releasable shut-off coupling according to claim 19, wherein said intermediate carrier member further comprises a substantially cylindrical barrel portion extending outwardly from said sleeve portion thereof, said barrel portion having an inner surface and an outer surface.

21. An automatically releasable shut-off coupling according to claim 20, wherein said substantially cylindrical barrel portion of said intermediate carrier member is slidably retained within said substantially cylindrical barrel portion of the housing of said stationary module such that said outer surface of said barrel portion of said intermediate carrier member is disposed adjacent said inner surface of said barrel portion of the housing of said stationary module.

22. An automatically releasable shut-off coupling according to claim 21, wherein the housing of said stationary module further comprises an inwardly directed annular flange, which annular flange defines a stop for said intermediate carrier member at said retracted position.

23. An automatically releasable shut-off coupling according to claim 22, wherein said intermediate carrier member further comprises a radial shoulder portion disposed between said barrel portion and said sleeve portion thereof, and wherein said shoulder portion abuts against said inwardly directed annular flange on the housing of said stationary module, to define a stop for said intermediate carrier member when said intermediate carrier member is in said retracted position.

24. An automatically releasable shut-off coupling according to claim 23, wherein said first biasing means comprises a spring member.

25. An automatically releasable shut-off coupling according to claim 24, wherein said spring member comprises a coil spring disposed around said barrel portion of said intermediate carrier member.

26. An automatically releasable shut-off coupling according to claim 25, wherein said coil spring is in compression at all times.

27. An automatically releasable shut-off coupling according to claim 26, wherein said coil spring is constructed and arranged to provide a biasing force of about one hundred pounds on said intermediate carrier member when said intermediate carrier member is in said extended position.

28. An automatically releasable shut-off coupling according to claim 27, wherein said coil spring is operatively mounted between said inwardly directed annular flange on the housing of said stationary module, and an outwardly directed annular flange on said intermediate carrier member.

29. An automatically releasable shut-off coupling according to claim 28, further comprising a balancing chamber disposed in operative relation between the housing of said stationary module and said intermediate carrier member, said balancing chamber being in fluid communication with said throughpassage in the housing of said stationary module so as to thereby permit pressurized fluid from within said shut-off coupling to enter into said balancing chamber to thereby substantially balance the forces acting on said housing and said intermediate carrier member in opposed directions along said longitudinal axis.

30. An automatically releasable shut-off coupling according to claim 29, wherein said substantially straight throughpassage is defined by a first fixed conduit portion and a second movable conduit portion having an internal end and an external end, wherein said second movable conduit portion is operatively retained within said stationary module for slidable movement relative to said intermediate carrier member along said longitudinal axis, when said intermediate carrier member is in said extended position, between a withdrawn position whereat said first fixed conduit portion and a second movable conduit portion are adjoined one to the other in fluid communicating end-to-end relation, and a protruding position whereat said second movable conduit portion is removed from said adjoinment to said first fixed conduit portion.

31. An automatically releasable shut-off coupling according to claim 30, wherein said first valve member blocks said throughpassage at said internal end of said second movable conduit portion.

32. An automatically releasable shut-off coupling according to claim 31, wherein said first and second valve members comprise flap type valves.

33. An automatically releasable shut-off coupling according to claim 32, wherein said first and second valve members comprise ball type valves.

34. An automatically releasable shut-off coupling according to claim 32, wherein said break-away module engages said second movable conduit portion such that when said break-away module is separated from said stationary module, said break-away module pulls said second movable conduit portion toward said protruding position.

35. An automatically releasable shut-off coupling according to claim 33, wherein said break-away module frictionally engages said second movable conduit portion such that when said break-away module is separated from said stationary module, said break-away module frictionally pulls said second movable conduit portion toward said protruding position.

\* \* \* \* \*